(12) United States Patent
Grieshaber et al.

(10) Patent No.: US 6,598,106 B1
(45) Date of Patent: Jul. 22, 2003

(54) DUAL-PORT SCSI SUB-SYSTEM WITH FAIL-OVER CAPABILITIES

(75) Inventors: Bruce Grieshaber, Colorado Springs, CO (US); Erich S. Otto, Colorado Springs, CO (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/471,642

(22) Filed: Dec. 23, 1999

(51) Int. Cl.[7] .................. G06F 13/14; G06F 15/173; H04B 1/74
(52) U.S. Cl. ............... 710/305; 709/239; 714/43; 714/56
(58) Field of Search .............. 710/312, 43–44, 710/300, 305; 709/239; 365/49; 714/43, 56

(56) References Cited

U.S. PATENT DOCUMENTS

| | | | |
|---|---|---|---|
| 4,017,828 A | | 4/1977 | Watanabe et al. |
| 4,245,344 A | | 1/1981 | Richter |
| 4,490,785 A | | 12/1984 | Strecker et al. |
| 4,747,115 A | | 5/1988 | Nambu |
| 5,289,589 A | | 2/1994 | Bingham et al. |
| 5,345,566 A | * | 9/1994 | Tanji et al. ........... 395/325 |
| 5,400,205 A | * | 3/1995 | Ligon et al. ........... 361/62 |
| 5,404,465 A | | 4/1995 | Novakovich et al. |
| 5,720,028 A | | 2/1998 | Matsumoto et al. |
| 5,790,775 A | | 8/1998 | Marks et al. |
| 6,044,207 A | * | 3/2000 | Pecone et al. ......... 395/309 |
| 6,078,979 A | * | 6/2000 | Li et al. ............... 710/312 |
| 6,098,117 A | * | 8/2000 | Foote et al. ........... 710/8 |
| 6,119,183 A | * | 9/2000 | Briel et al. ........... 710/316 |
| 6,389,492 B1 | * | 5/2002 | Larson et al. ......... 710/107 |

* cited by examiner

Primary Examiner—Glenn A. Auve
Assistant Examiner—Trisha Vu
(74) Attorney, Agent, or Firm—Carstens, Yee & Cahoon, LLP (57) ABSTRACT

A dual port enclosure monitor for servicing a dual port bus includes four primary components: two enclosure monitors and two bus expanders with isolation circuitry. The subsystem is configured such that an enclosure monitor and an expander are both connected to an external port. The internal bus then connects the two expanders, as well as all of the internal devices (e.g. hard drives, CD-ROMs, tape drives). The enclosure monitors can communicate with various host devices over the external buses. These host devices can instruct the enclosure monitor to either connect or isolate the internal bus, thereby the peripherals attached to it. This is accomplished through a set of independent control signals that run between the monitor and the expander. There are three different methods of control. The first is independent, paired control between enclosure monitor/bus expander pairs. A separate host controls each enclosure monitor/bus expander pair. The second involves the enclosure monitor/bus expander pairs having cross over control between the ports. There, a single host send requests to both pairs, but using the opposite port as the port to be isolated. The recipient enclosure monitor controls the opposite port from its connection port. The third method utilizes two dependent enclosure monitor/bus expander pairs. The pairs are connected through an interconnection bus and can communicated isolation states as well as pass on isolation requests. As a further improvement, the pair of enclosure monitors is replace with a single enclosure monitor, which controls both bus expanders.

36 Claims, 11 Drawing Sheets

Figure 1 server　　　Figure 2

Figure 10B ized. The recipient enclosure monitor controls the opposite port from its connection port. The third method utilizes two dependent enclosure monitor/bus expander pairs. The two enclosure monitors are connected through an interconnection bus and can communicated isolation states as well as pass on isolation requests.
DUAL-PORT SCSI SUB-SYSTEM WITH FAIL-OVER CAPABILITIES

BACKGROUND OF THE INVENTION

1. Technical Field

The present invention relates to a method and system for isolating and reconnecting a dual port bus from a primary bus.

2. Description of Related Art

It is well known to interconnect peripherals in a computer system by means of a bus. For example, a host processor may be connected to a number of disk drive peripherals by a bus, such as a standard SCSI (small computer system interface) bus. An advantage of using a SCSI bus is that there are many standard, commercially available peripherals, such as SCSI disk drive peripherals, which can be connected to the bus.

A failure of any peripheral on a bus has the potential to bring down the entire bus and thereby shutting down every other peripheral and/or component on the bus. In a worst case scenario, a catastrophic system failure can be precipitated by a failure of any single peripheral on the bus. However, even if the other peripherals on a bus remain operable following the failure one peripheral, the bus performance may be compromised and communication between a host and the peripherals impaired.

A dual port enclosure has the advantage of accessing the main bus via a second port if the primary or first port causes errors on the main bus. A technician can perform a test and recovery procedure intended to identify the likely source of the bus errors and then attempt to recovery the main bus by manually isolating the faulty device from the main bus. If the faulty device is attached to an external bus within an enclosure, the entire enclosure and all of its functionality must be isolated from the main bus. If the enclosure is dual ported, the technician may be able to restore the functionality of the enclosure to the main bus by logically connecting the second port to the main bus and then recheck the main bus for errors. However, unless a technician is available, the advantages of the dual port enclosure are lost.

It would be advantageous to provide an automated means for isolating an expansion bus from a main bus. It would be further advantageous to improve techniques for controlling logical isolation and logical connection of a dual port bus.

SUMMARY OF THE INVENTION

The present invention relates to a system and method for providing more complete control of a dual port bus. There are four primary components: two enclosure monitors; and two SCSI bus expanders with isolation circuitry. The subsystem is configured such that an enclosure monitor and an expander are both connected to an external port, but not necessarily the same external port. The internal bus then connects the two expanders, as well as all of the internal SCSI devices (e.g. hard drives, CD-ROMs, tape drives). The enclosure monitors can communicate with various host devices over the external SCSI buses. These host devices can instruct the enclosure monitor to either connect or isolate the internal SCSI bus; thereby the peripherals attached to it. This is accomplished through a set of independent control signals that run between the monitor and the expander. There are three different methods of control. The first is independent, paired control between enclosure monitor/bus expander pairs. A separate host controls each enclosure monitor/bus expander pair. The second involves the enclosure monitor/bus expander pairs having cross over control between the ports. There, a single host sends requests to both pairs, but using the opposite port as the port to be isolated. The recipient enclosure monitor controls the opposite port from its connection port. The third method utilizes two dependent enclosure monitor/bus expander pairs. The two enclosure monitors are connected through an interconnection bus and can communicated isolation states as well as pass on isolation requests.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
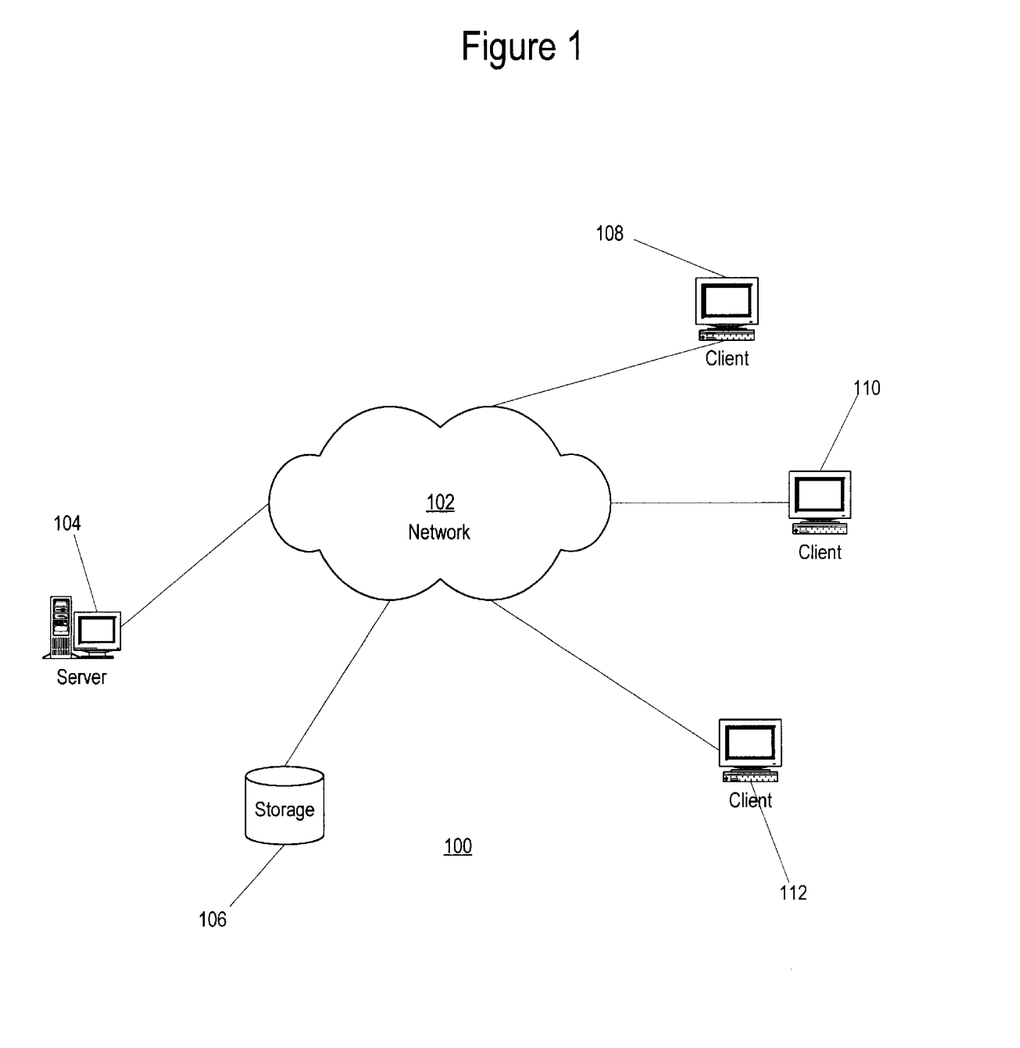
FIG. 1 is a pictorial representation of a distributed data processing system in which the present invention may be implemented.

With reference now to the figures, FIG. 1 is a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer coupled to a network, which receives a program or other application from another computer coupled to the network. In the depicted example, server 104 provides data, such as boot files, operating system images, and applications to clients 108, 110 and 112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, education, and other computer systems that route data and messages. Of course, distributed data processing system 100 may also be implemented as a number of different types of networks, such as an intranet, a local area network (LAN), or a wide area network (WAN). FIG. 1 is intended as an example and not as an architectural limitation for the present invention.

Figure 2:
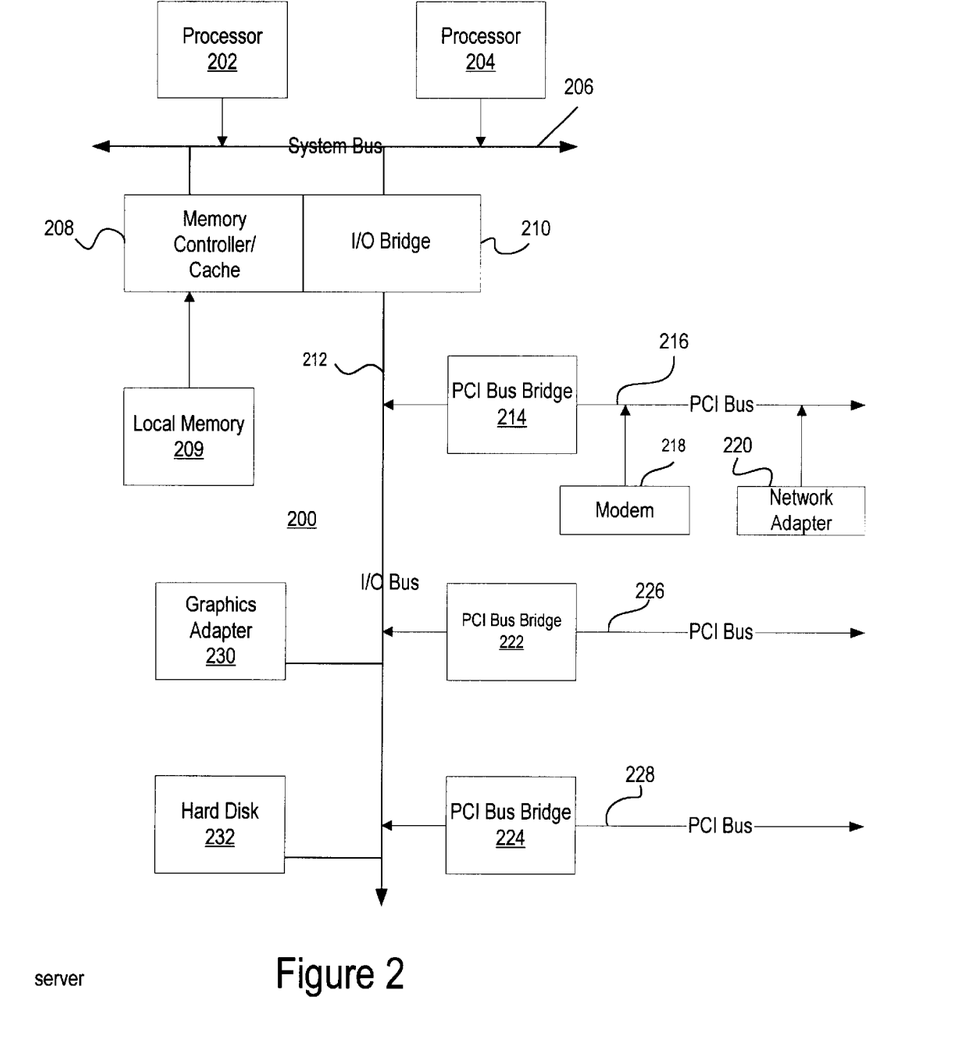
FIG. 2 is a block diagram depicting a data processing system that may be implemented as a server in accordance with a preferred embodiment of the present invention.

Referring to FIG. 2, a block diagram depicting a data processing system, which may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. A memory-mapped graphics adapter 230 and hard disk 232 may also be connected to I/O bus 212 as depicted either directly or indirectly.

Those of ordinary skill in the art will appreciate that the hardware depicted in FIG. 2 may vary. For example, other peripheral devices, such as optical disk drives and the like, may also be used in addition to or in place of the hardware depicted. The depicted example is not meant to imply architectural limitations with respect to the present invention. The data processing system depicted in FIG. 2, for example, may be an IBM RISC/System 6000 system, a product of International Business Machines Corporation in Armonk, N.Y., running the Advanced Interactive Executive (AIX) operating system.

Figure 3:
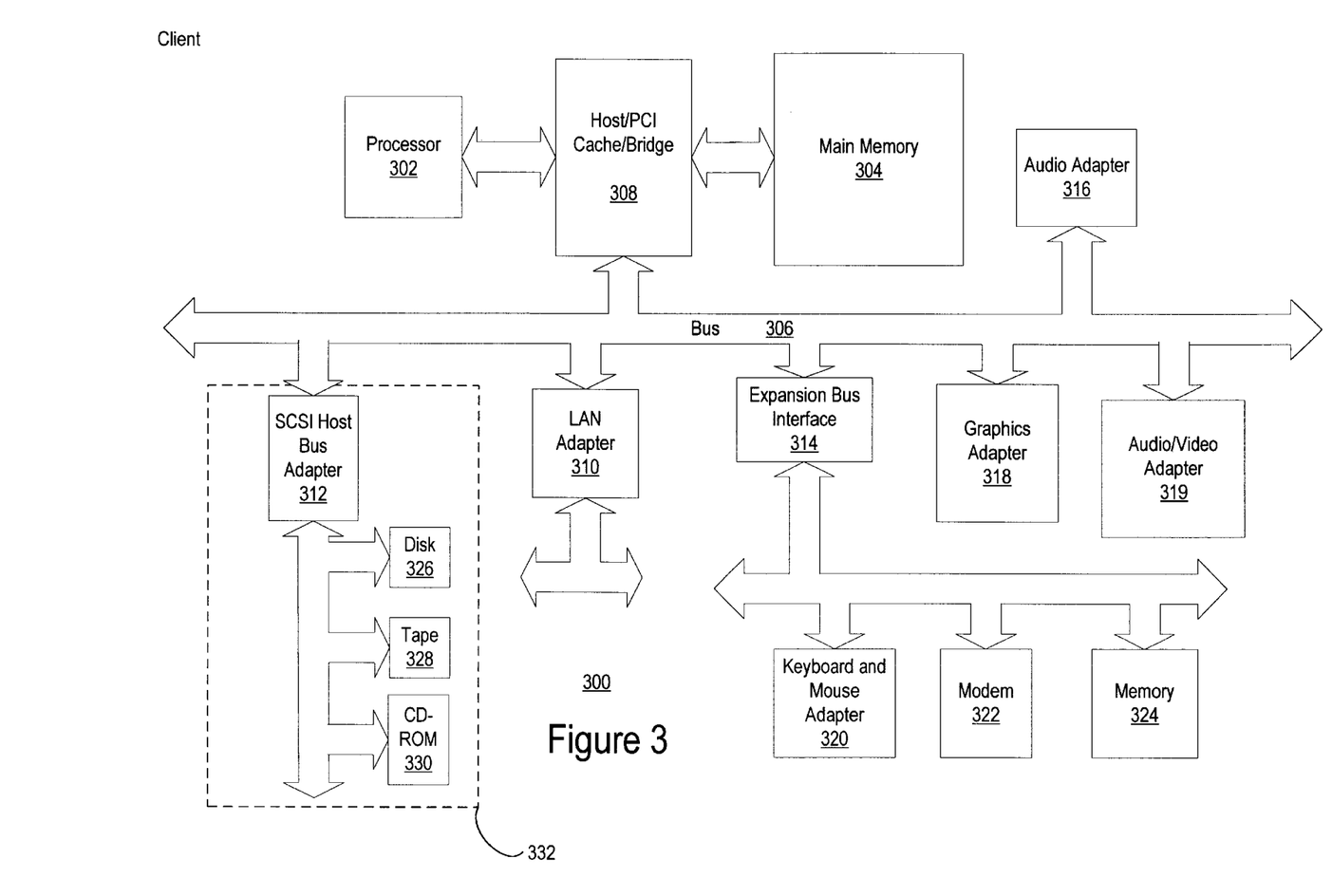
FIG. 3 is a block diagram illustrating a data processing system in which the present invention may be implemented.

With reference now to FIG. 3, a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations support three or four PCI expansion slots or add-in connectors.

An operating system runs on processor 302 and is used to coordinate and provide control of various components within data processing system 300 in FIG. 3. The operating system may be a commercially available operating system such as a UNIX based operating system, AIX for instance, which is available from International Business Machines Corporation. "AIX" is a trademark of International Business Machines Corporation. Other operating systems include OS/2. An object oriented programming system, such as Java, may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3, denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide nonvolatile memory for storing operating system files and/or user-generated data.

Neither the depicted example in FIG. 3 nor the above-described examples are meant to imply architectural limitations.

In accordance with preferred embodiments of the present invention, it is understood that the present invention may be implemented in one or all of the applications discussed with respect to FIGS. 1–3. For instance, the present invention might be incorporated as or in a network controller or the like used, for configuring networks of the types depicted in FIG. 1. In another implementation, the present invention may be incorporated in any of PCI bus bridges 214–224 or any other bus bridge such as I/O bridge 210, each shown in FIG. 2. In another instance, the present invention may be included in any other network adapter, which is capable of adapting to a bus segment having peripherals attached to it. Specifically, SCSI host bus adapter 312, LAN adapter 310, and expansion bus interface 314, shown on FIG. 3, would be ideal candidate devices for the inclusion of the present invention. Still further, and not shown in the preceding figure, the present invention may be incorporated ion bus and connection segments at chip or processor level, thereby incorporating one or multiple instances of the present invention onboard a conventional microchip. Other applications will become apparent to those of ordinary skill in the art with the following discussion of the features of the present invention.

Figure 4:
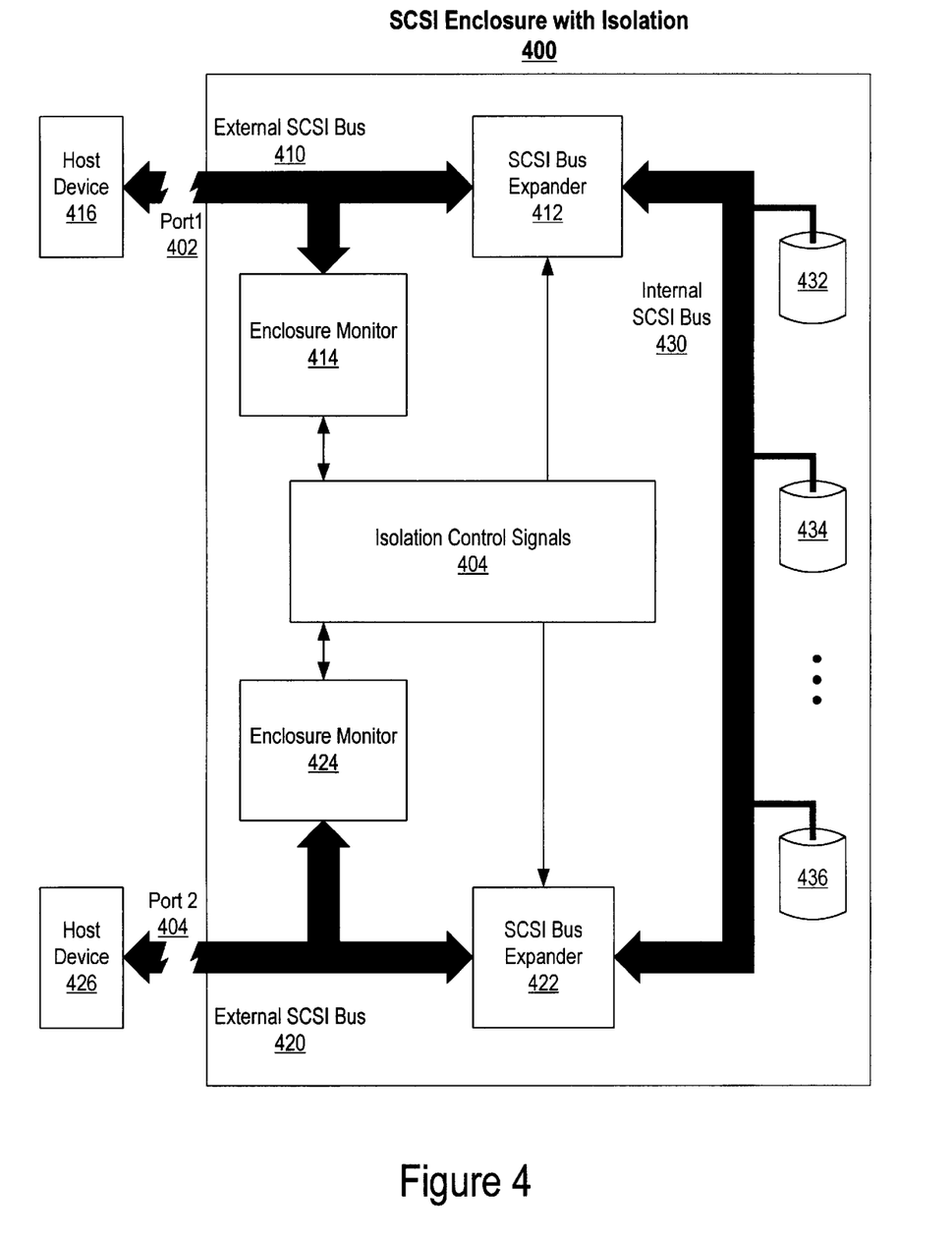
FIG. 4 is a block diagram depicting a SCSI enclosure with isolation in accordance with a preferred embodiment of the present invention.

FIG. 4 is a block diagram depicting a dual port SCSI enclosure with isolation in accordance with a preferred embodiment of the present invention. An "enclosure," for the purposes of the present invention, is any sub-system containing semi-autonomous features or components such as fans, power supplies and peripheral devices. SCSI enclosure 400 comprises two external ports, port 1 402 and port 2 404, connected to external bus 410 and 420, respectively. External to enclosure 400, port 1 402 connect to host device 416, while port 2 404 connects to host device 426. Host devices 416 and 426 are shown as single devices but in practice might be a plurality of host devices. Each port in SCSI enclosure 400 is connected to internal SCSI bus 430 through a separate SCSI bus expander via a segment of external SCSI bus. Port 1 402 connects through external SCSI bus 410 to SCSI bus expander 412, while port 2 404 connects through external SCSI bus 420 to SCSI bus expander 422. Additionally, SCSI enclosure 400 includes a pair of enclosure monitors, 414 and 424 which continually monitor the external buses associated with dual ports 402 and 404 for bus isolation or bus connection requests issued from host devices 416 and/or 426. Once an request is received by an enclosure monitor, that enclosure monitors sends an isolation control signal 404 to one of SCSI bus expanders 412 and 422, and possibly the opposing enclosure monitor. The isolation control signals, as well as enclosure monitor/bus expander pair configurations, will be discussed in detail below with respect to FIGS. 6, 8, 10A and 10B.

Figure 5:
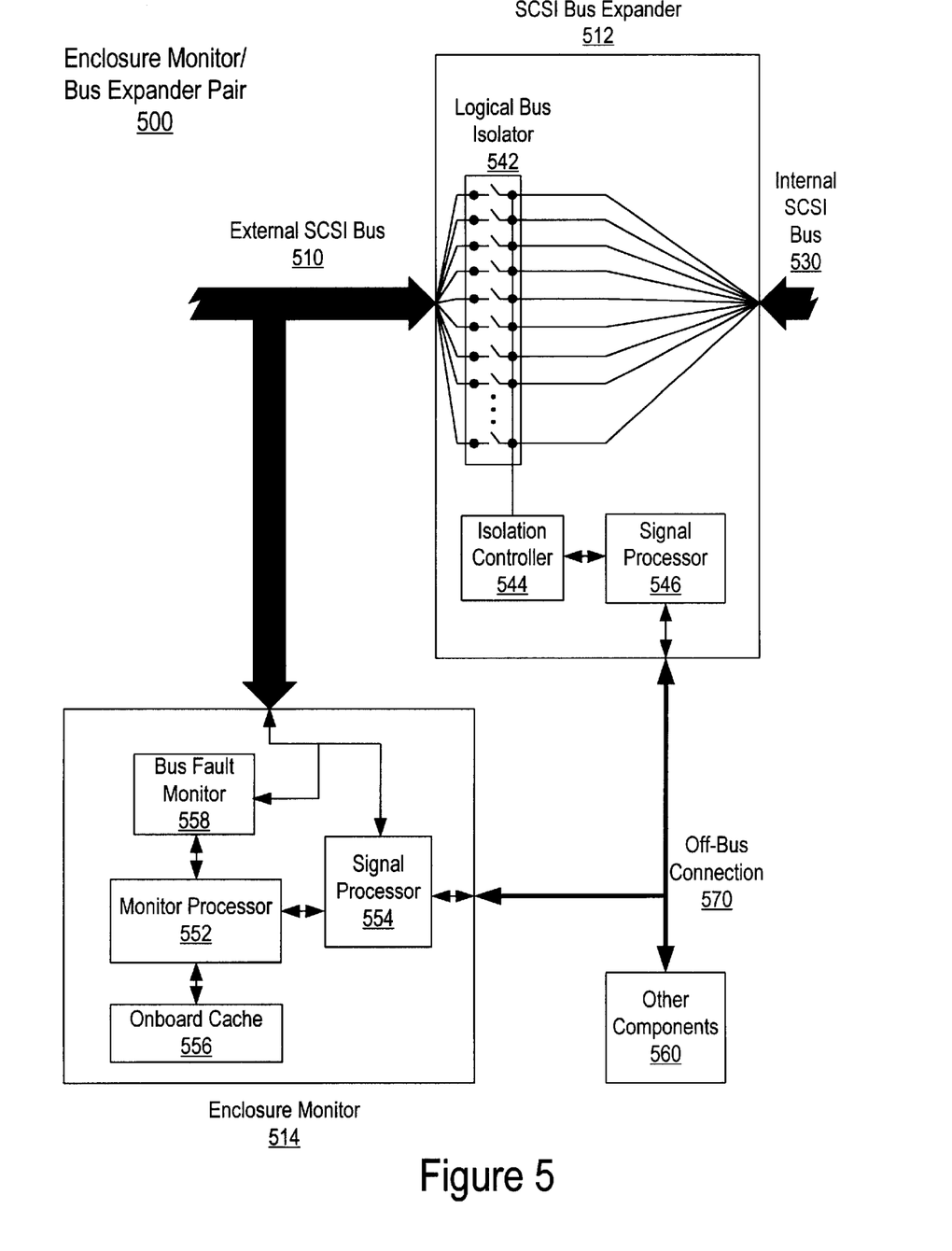
FIG. 5 is a block diagram depicting an enclosure monitor/bus expander pair in accordance with a preferred embodiment of the present invention.

FIG. 5 is a block diagram depicting an enclosure monitor/bus expander pair in accordance with a preferred embodiment of the present invention. Each enclosure monitor/bus expander pair in a dual port enclosure connects to at least an external SCSI bus and an internal SCSI bus. In the depicted figure, enclosure monitor/bus expander pair 500 comprises SCSI bus expander 512 and enclosure monitor 514, each being connected to external SCSI bus 510. Additional, SCSI bus expander 512 and enclosure monitor 514 are connected to each other and to other component 560 within the enclosure by off-bus connection 570. SCSI bus expander 512 is further connected to internal SCSI bus 530 that may have one or more peripheral devices attached to it.

Clearly, an isolation request issued from a host may take a number of different forms depending on the embedded intelligence of monitor 514. For instance, a host request may include an isolation bit, which when set, directs enclosure monitor 514 to include a toggle instruction in the isolation control signal transmitted to SCSI bus expander 512. Alternatively, the host request may instead include a logical isolation state declaration which directs enclosure monitor 514 to include a specific logical state set declaration within the isolation control signal sent to SCSI bus expander 512. SCSI bus expander 512 then sets the logical isolation state of internal SCSI bus 530 in accordance with the logical isolation state declaration, either logical isolate or logical connect. In this instance, the host request would include an isolation bit, which when set, directs enclosure monitor 514 to include the logical isolate instruction in the isolation control signal. When the isolation bit remains cleared, the host request directs enclosure monitor 514 to include a logical connect instruction within the isolation control signal.

The SCSI protocol is adaptable enough to support any host request command or format. SCSI protocol supports vendor unique commands, so the particular form or format of the host request may be predicated on any command protocol chosen by the individual component vendors.

While the above mentioned embodiments assume that each host is connected to a single enclosure monitor through a single port, a single most may control both ports of a dual port enclosure. A typical bus fault procedure might be the issuance of heartbeat messages to each identified component on the bus. For instance, the host may issue a test_unit_ ready message to individual components and enclosures at heartbeat intervals. Once received by a component, the message invokes a response if that component is working. Should the message not invoke a response from a component, the host concludes that the component is faulty and executes a test and recovery procedure. In that case a host might issue isolation instructions to either port's enclosure monitor or issue instructions simultaneously to both port's enclosure monitors, such as swap_active_port for freeing a hung bus.

Other bus fault procedures include the host invoking a test and recovery procedure after a predetermined time interval without activity on the bus. In that case the test and recovery procedure might include issuing test$_{13}$ unit$_{13}$ ready messages to each component and enclosure attached to the bus. Should the message not invoke a response from an enclosure, the host concludes that a component within that enclosure is faulty and issues an isolation instruction to the enclosure monitor attached to the active port of the enclosure. Then the host rechecks for bus activity perform the test and recovery procedure as often as necessary to free up the bus.

Alternatively, the embedded intelligence within enclosure monitor 514, discussed in detail below, may be far-reaching enough to invoke any of the bus fault procedures above. These include issuing heat beat messages to the controlling host in order to test the condition of both external bus 510 and internal bus 530. If enclosure monitor 514 receives no response, the enclosure monitor autonomously invokes a test and recovery procedure for the enclosure.

Enclosure monitor 514 may be reconfigured for performing a number of different tasks. In accordance with a preferred embodiment, enclosure monitor 514 may be comprised of signal processor 554 connected to external SCSI bus 510, off-bus connection 570 and monitor processor 552. Here enclosure monitor 514 receives isolation and/or connection requests from a host on external SCSI bus 510 using signal processor 554. Signal processor 554 transmits the request to monitor processor 552, which processes the host's request and directs signal processor 554 to generate an appropriate isolation control. The isolation (or connect) control signal is then sent to SCSI bus expander 512 over off-bus connection 570.

Once SCSI bus expander 512 receives the isolation control signal, the control signal is processed by signal processor 546 and sent to isolation controller 544. An isolation control signal may contain one of two types of instructions—a toggle instruction or a declarative isolation state change instruction. A declarative isolation state change instruction may be accomplished by setting a bit within the control signal, for example, bit on for isolate, bit off for connect.

Alternatively, a declaration isolation control signal may merely consist of a high state for isolating internal bus 530 and a low state for connecting internal bus 530 to external bus 510, or vise versa. In that case the isolation state signal would merely mimic the isolation control signal once SCSI bus expander 512 completed the instruction. Going to a high state for indicating that internal bus 530 has been isolated and a low state for indicating that internal bus 530 has been connected to external bus 510. In accordance with this embodiment, off-bus connection 570 would consist of two separate conductors, one for the isolation control signal and the other for the isolation state signal.

The toggle instruction may merely be inferred from the presence of an isolation control signal. Alternatively a toggle instruction might be an isolation control signal consisting of a high state across a conductor of off-bus connection 570.

Also included in the isolation control signal is a definition of the target SCSI bus expander. As can be seen from the block diagram depicted in FIG. 5, the target bus expander and any other bus expanders attached to off-bus connection 570 receive an isolation control signal issued by enclosure monitor 514. Therefore, to avoid responding to an inappropriate control signal, the control signal may identify the target SCSI bus expander in addition to carrying the isolation control instruction.

In response to receiving an isolation control signal containing a toggle instruction, isolation controller 544 toggles a plurality of logical switches located in logical bus isolator 542, thereby changing the logical isolation state of internal SCSI bus 530. Alternatively, isolation controller 544 responds to an isolation control signal containing logical state declaration instruction by resetting the plurality of logical switches located in logical bus isolator 542 as specified by the logical state declaration. The switches can be reset either by logically isolate internal SCSI bus 530 from external SCSI bus or by connecting the two. In either case, after the logic state change has been performed, state isolation controller 544 returns an isolation state signal to enclosure monitor 514. Returning an isolation state signal may be as simple as indicating that the toggle has been performed, or as complex as isolation controller 544 querying logical state information from logical bus isolator 542 and returning the results of that query to enclosure monitor 514. In other embodiments, isolation controller 544 provides isolation state information to enclosure monitor 554 in response to isolation state inquiries or at regular time intervals. Also included in the isolation state signal, is the identity of the SCSI bus expander sending the signal. As can be seen from the block diagram depicted in FIG. 5, any enclosure monitor connected to off-bus connection 570 will receive every isolation state signal on off-bus connector 570. Therefore, the isolation state information must identify the source bus expander so that the target enclosure monitor can properly process the state information.

Subsequent to SCSI bus expander 512 responding to the isolation control signal, enclosure monitor 514 receives an isolation state signal from SCSI bus expander 512 indicating that a logical isolation state change has occurred in the SCSI bus expander 512. Similar to both the host request and the isolation control signal, the isolation state signal from SCSI bus expander 512 can take at least two different forms, either a logical isolation state change indication and a logical isolation state declaration. Enclosure monitor 514 then processes the isolation state signal in according to the form of the isolation state signal and then replies to the host. The reply might merely indicate that the logical isolation state of internal SCSI bus 530 has changed. However, the reply might include a declaration specifying the new state of state of internal SCSI bus 530.

In accordance with a preferred embodiment of the present invention, enclosure monitor 514 can return a current isolation state declaration to a host even if SCSI bus expander 512 does not declare the current state of the bus, i.e., include an isolation state declaration in the isolation state signal. This is possible by tracking the logical isolation state from a known startup state and storing it in onboard cache 556. Monitor processor 552 then changes the current isolation state in onboard cache 556 each time it receives a state change indication from SCSI bus expander 512.

In accordance with another preferred embodiment of the present invention, enclosure monitor 514 responds autonomously to bus faults and errors, and therefore, need not necessarily receive any host isolation requests. Clearly, an important aspect of the present invention is for the enclosure to respond appropriately when faced with a bus failure. In one preferred embodiment of the present invention, a host detects errors on external SCSI bus 510, and in response, generates isolation requests to various connected internal buses. However, enclosure monitor 514 may also contain a bus fault monitor for detecting bus errors. In that configuration, bus fault monitor 558 constantly monitors external SCSI bus 510 for bus errors. Once an error is detected or the bus becomes hung or unstable, bus fault monitor 558 passes the bus failure information on to monitor processor 552. Monitor processor 552 immediately directs signal processor 554 to generate an isolation control signal for logically isolating internal SCSI bus 530. If bus fault monitor 558 continues to register a fault on external bus 510, monitor processor 552 may command signal processor 554 to generate a connect isolation control signal because isolating the internal bus did not resolve the external bus fault.

More importantly, enclosure monitor 514 may conduct a failover process by issuing isolation control signals for its paired SCSI bus expander, or by issuing isolation control signals to other components 560, which may include other SCSI bus expanders attached to a port outside its pair. In so doing enclosure monitor 514 monitors external SCSI bus 510 for errors while alternatively isolating and connection internal buses. A faulty internal bus is detected when external bus errors subside or cease in response to that bus being logically isolated from the external bus. Conversely, enclosure monitor 514 may receive isolation state signals from outsides its pair. Each of these scenarios will be discussed in greater detail below. However, when configured without bus fault monitor 558, enclosure monitor 514 responds to isolation requests from an external host. In that case, the host would implement the failover process rather than intelligence embedded on enclosure monitor 514.

Figure 6:
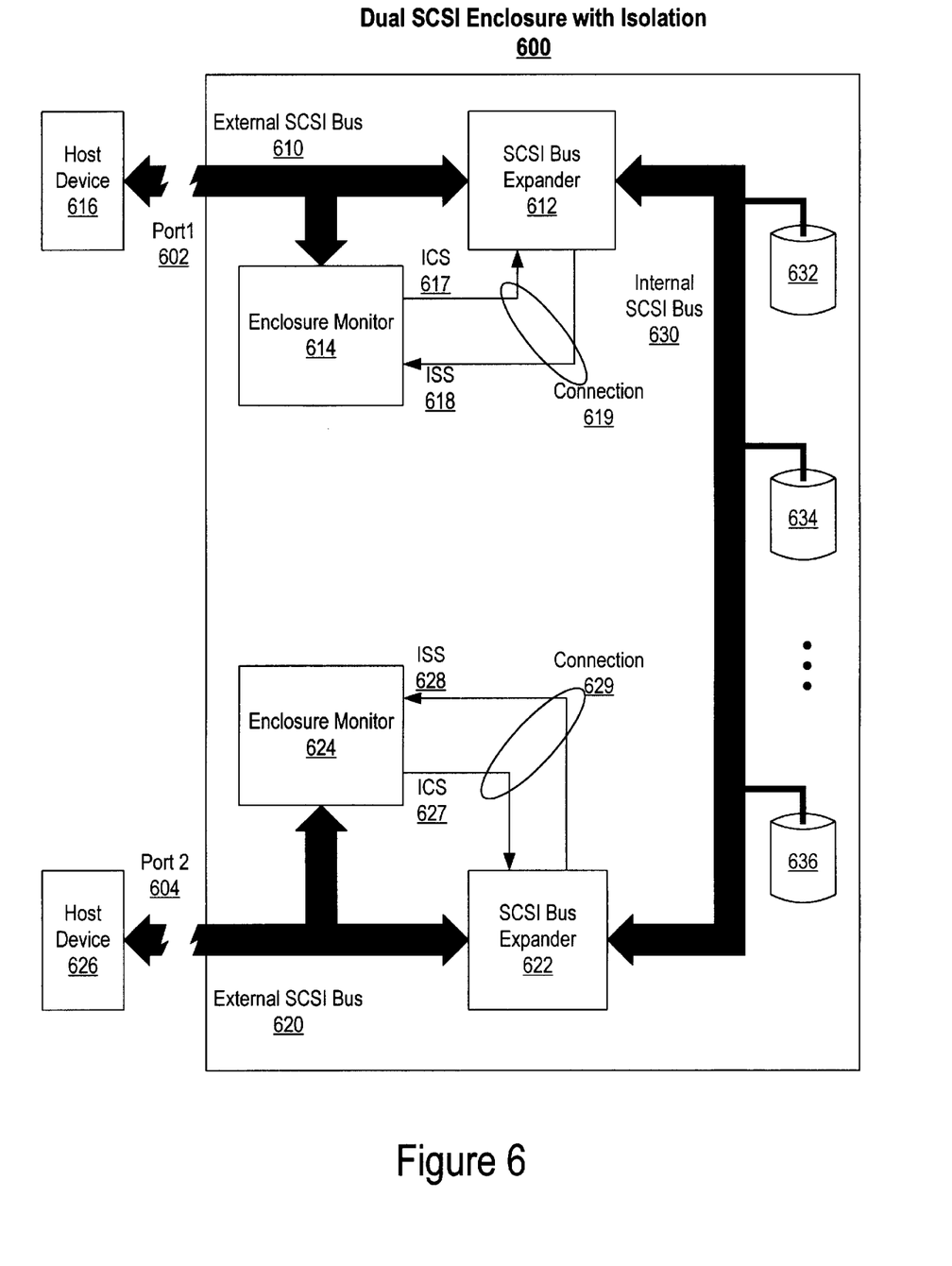
FIG. 6 is a block diagram depicting a dual SCSI enclosure with isolation capabilities in accordance with a preferred embodiment of the present invention.

FIG. 6 is a block diagram depicting a dual SCSI enclosure with isolation capabilities in accordance with a preferred embodiment of the present invention. Dual SCSI enclosure 600 provides a means for isolating one port or the other port on a dual ported internal bus from external buses. Dual SCSI enclosure 600 is similar in many respects to dual SCSI enclosure 400 and comprises two external ports, port 1 602 and port 2 604, each connected to external buses 610 and 620, respectively. Host device 616 communicates through external bus 610 to enclosure monitor 614 while host device 626 is linked through port 2 604 to enclosure monitor 624. Each enclosure monitor within dual SCSI enclosure 600 is connected to one bus expander through an off-bus connection. Enclosure monitor 614 transmits isolation control signals 617 through off-bus connection 619 and receives isolation state signals 618 from the same off-bus connection. On port 2 604, enclosure monitor 624 transmits isolation control signals 627 through off-bus connection 629 and receives isolation state signals 628 from the same off-bus connection. Each port in SCSI enclosure 600 is connected to internal SCSI bus 630 through a separate SCSI bus expander via a segment of external SCSI bus.

In this embodiment each host controls one port. This allows the monitor to only be concerned with its own bus and not have to look at any other port. As an example, host device 616 detects a bus fault on external SCSI bus 610 and sends an isolation request to enclosure monitor 614 over that bus. After having received the isolation request, enclosure monitor 614 issues isolation control signal 617 to SCSI bus expander 612 which logically isolate internal SCSI bus 630 from external SCSI bus 610 in response to receiving the isolation control signal. SCSI bus expander 612 then transmits isolation state signal 618 to enclosure monitor 614. The drawback to this method is that if the bus hangs, i.e. no data can be transmitted across external SCSI bus 610, host device 616 may not be able to communicate with enclosure monitor 614 to send an isolation request. Therefore, some additional intelligence must be embedded in the enclosure monitor, such as bus fault monitor 558 shown in FIG. 5, so that the enclosure monitor determines when it is necessary to isolate its port.

Figure 7:
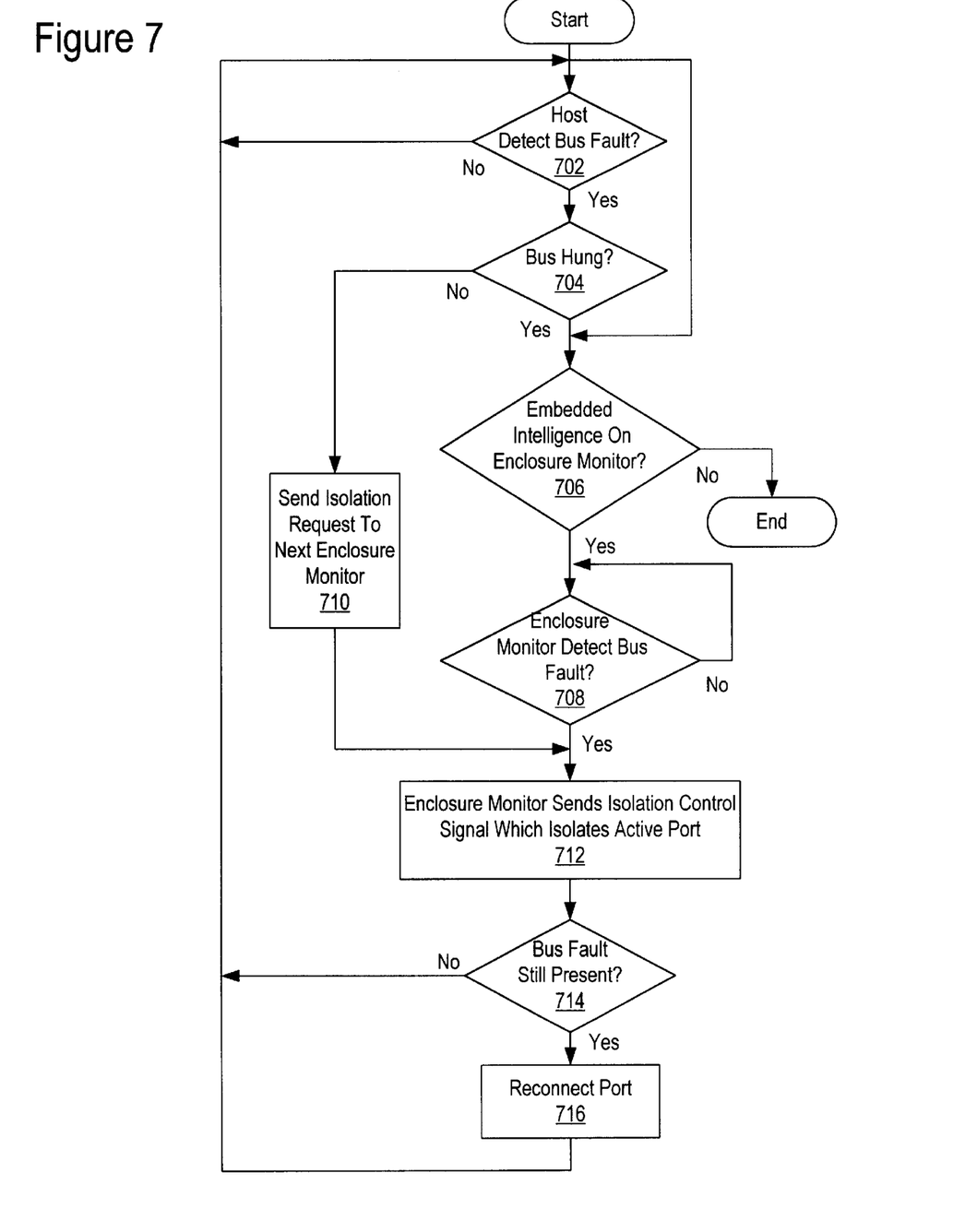
FIG. 7 is a flowchart depicting a process for isolating a bus based on the onboard intelligence of the enclosure monitor in accordance with a preferred embodiment of the present invention.

FIG. 7 is a flowchart depicting a process for isolating a bus based on the onboard intelligence of the enclosure monitor in accordance with a preferred embodiment of the present invention. The process begins either at step 702 or step 706 depending on where the bus fault intelligence is located, the host to the enclosure monitor. Assuming the host, the process begins with a determination of the host detecting a bus fault (step 702). If no fault is detected the flow repeatedly tests for the bus fault at step 702. This is a recursive procedure that constantly monitors the bus for errors or faults using one of the methods described above with respect to the discussion of FIG. 5. If a bus fault is detected the host can only send a request across the bus if it is not hung, so a test to determine if the bus is hung is preformed (step 704). If the bus is not hung the host sends an isolation request to the next enclosure monitor according to the test and recovery procedure (step 710). As noted above, the processes depicted by FIG. 7 is a recursive process which recursively test the bus for errors and eliminates possible faulty devices within enclosures based on the preset test and recovery procedure. The next enclosure monitor issues an isolation control signal to the bus expander (step 712). The bus expander then logically isolates a secondary bus from the bus. Returning to step 704, if the bus is hung the process can only proceed if there is embedded intelligence on the enclosure monitor for autonomously detecting bus fault (step 706). If the enclosure monitor is not configured with such intelligence, the process ends with the bus being hung. If, on the other hand, the enclosure monitor is configured with such intelligence, such as a bus fault monitor, a determination is made as to whether the enclosure monitor has detected the bus fault (step 708). Until the enclosure monitor detects the bus fault, the bus continues to be hung and the process continually checks the bus for a fault (step 708). Once the bus fault is detected by its onboard intelligence, the enclosure monitor can issue an isolation control signal to the bus expander (step 712). The bus expander then logically isolates a secondary bus from the external bus. Next, the bus is again tested to determine whether the errors are still present (step 714). If the bus is error free the process returns to step 702 and resumes testing the bus. If isolating the bus did not cure the errors on the bus, then the isolated bus will be reconnected (step 716) and the process returned to step 702 above in order to isolate another enclosure in an effort to free the bus from errors. The process continue until the faulty enclosure is found and isolated.

Figure 8:
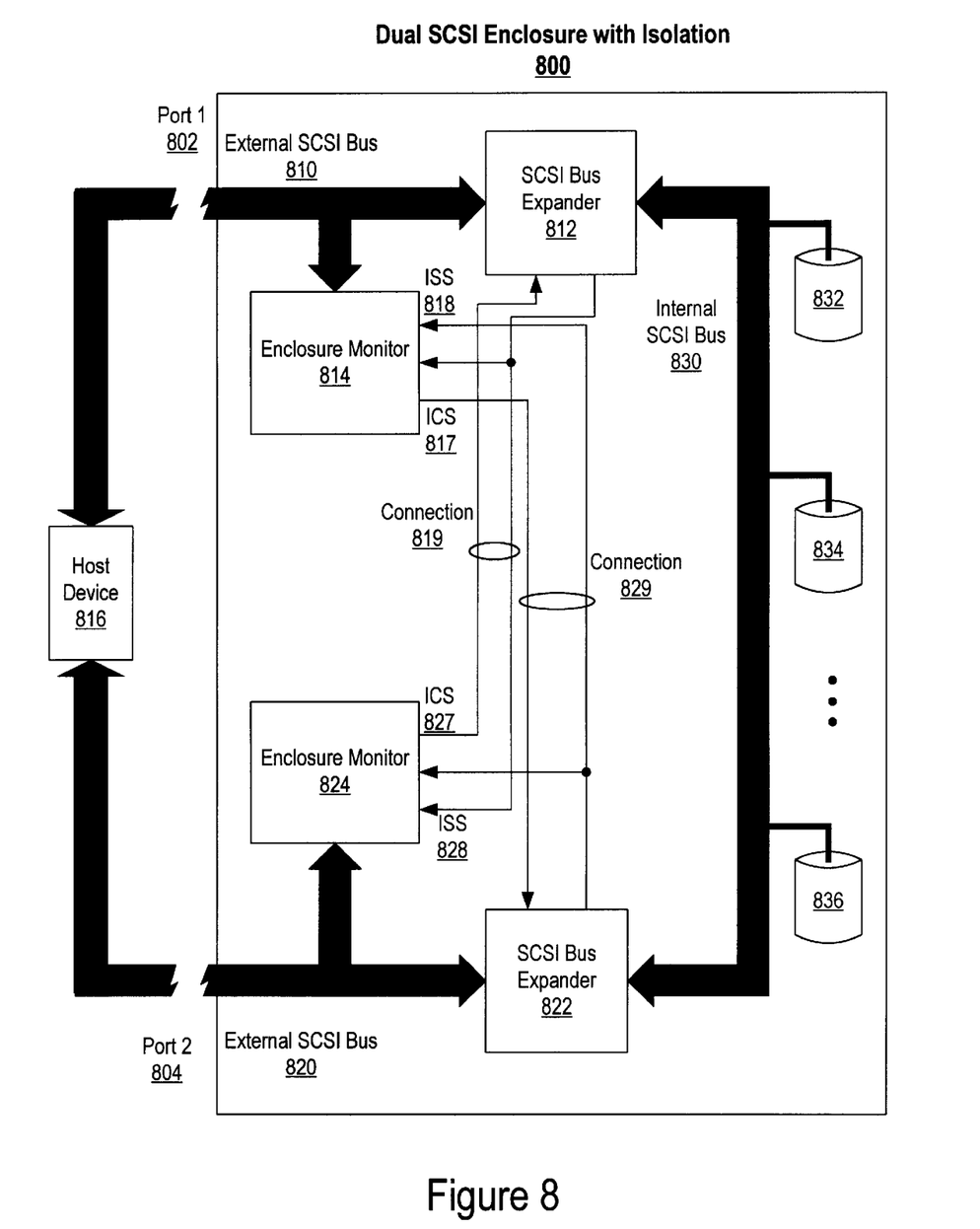
FIG. 8 is a block diagram depicting a dual SCSI enclosure with cross over isolation capabilities in accordance with a preferred embodiment of the present invention.

FIG. 8 is a block diagram depicting a dual SCSI enclosure with cross over isolation capabilities in accordance with a preferred embodiment of the present invention. Dual SCSI enclosure 800 depicted in FIG. 8 is very similar to dual SCSI enclosure 600 depicted in FIG. 6, therefore, only the difference will be discussed. In dual SCSI enclosure 800 each enclosure monitor is paired with a bus expander connected to a disparate external bus. This off-bus connection cross over pairing guarantees that isolation requests will be sent on an external bus other than the faulty bus. Dual SCSI enclosure 800 includes port 1 802 and port 2 804 which are connected to host device 816. In this embodiment the same host controls both enclosure monitors 814 and 824. However, rather than enclosure monitor 814 being connected to SCSI bus expander 812, it is connected to SCSI bus expander 822 through off-bus connection 829. Therefore, whether or not if external SCSI bus 810 becomes hung or not, host device 816 sends isolation requests to enclosure monitor 824 for isolating external SCSI bus 810 from internal bus 830, rather than to enclosure monitor 814.

Off-bus connections 819 and 829 differ from previous embodiments in that they cross over to the opposite port within the enclosure and include path for an isolation state signal to both enclosure monitors instead of just the controller's monitor. For example, off-bus connection 829 comprises isolation control signal 817 for delivering isolation control signals 817 from enclosure monitor 814 to SCSI bus expander 822. Off-bus connection further includes isolation state signal 818 from SCSI bus expander 822 to enclosure monitor 814 with a separate path to enclosure monitor 824. Off-bus connection 819 is similar in design but services port 2 804 and enclosure monitor 824.

Dual SCSI enclosure 800 is normally used in a system where the same host device is connected to both ports. It could then determine if one of the ports was in a hung state and still be able to disable the hung port by performing an access to the controlling enclosure monitor through a second channel. The inclusion of an onboard bus fault on either of the enclosure monitors would not be feasible in the present configuration because neither enclosure monitor controls the port that it monitors. However, each enclosure monitor senses the isolation state of each SCSI bus expander through isolation state signal connections to each bus expander. Therefore, host device 816 can always assess the isolation state of either bus expander on dual SCSI enclosure 800 from a single accessible enclosure monitor. If one bus is in a hung state, host device can access the opposite enclosure monitor for the isolation state of dual SCSI enclosure 800 and control the opposite bus expander, thereby isolating the faulty port.

Figure 9:
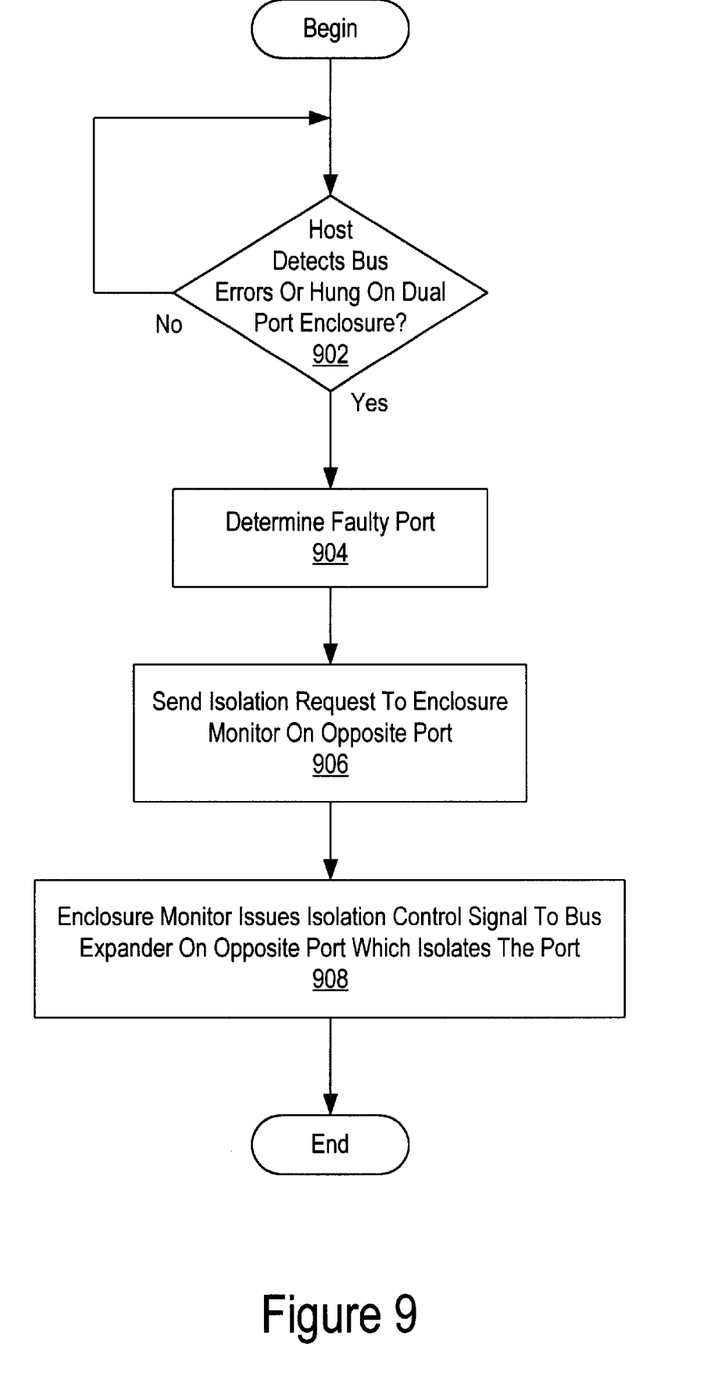
FIG. 9 is a flowchart depicting a process for isolating a bus based on the dual port enclosure have cross over control in accordance with a preferred embodiment of the present invention.

FIG. 9 is a flowchart depicting a process for isolating a bus based on the dual port enclosure have cross over control in accordance with a preferred embodiment of the present invention. The process begins with the host device in a ready state awaiting the detection of a bus fault. Again, the host device monitors both external buses connected to the dual port enclosure. The host device continually checks for faults (step 902). If none are found the process repeatedly returns to step 902 for bus checking. Once a bus fault is detected the host device determines the faulty port (step 904) and sends an isolation request to the dual port enclosure on the opposite port (step 906). From there, the enclosure monitor serving that port receives the isolation request and issues and isolation control signal to the opposite bus expander which isolates the faulty port.

Figure 10A:
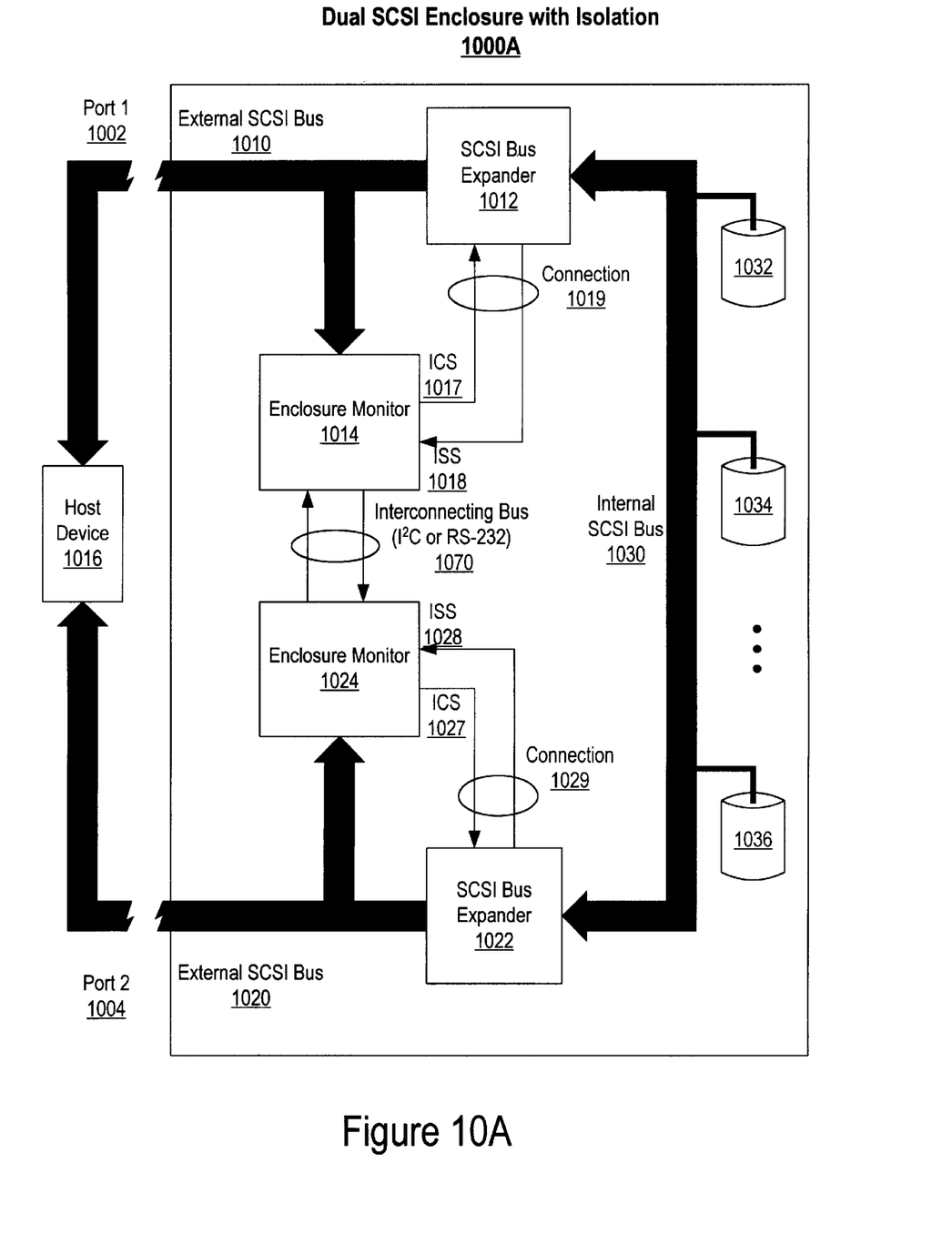
FIG. 10A is a block diagram depicting a dual SCSI enclosure with an interconnecting communication channel between enclosure monitors in accordance with a preferred embodiment of the present invention.

FIG. 10A is a block diagram depicting a dual SCSI enclosure with an interconnecting communication channel between enclosure monitors in accordance with a preferred embodiment of the present invention. Dual SCSI enclosure 1000A depicted in FIG. 10 is very similar to dual SCSI enclosure 600 depicted in FIG. 6, therefore, only the difference will be discussed. In dual SCSI enclosure 1000A the enclosure monitors communicate with one another which enables a single host device to control from either port, even if the bus connected to one port is in a hung state. In the present embodiment host device 1016 could initially send a request to the controlling enclosure monitor of over the faulty bus, similar to the method used in FIG. 6. Alternatively, the host device could send an isolation request to the opposite post using an error-free bus, whereby the enclosure monitor at that port communicates to the controlling enclosure monitor using an interconnecting communication channel between enclosure monitors. Alternative to both methods, a host device could send an isolation request to each port simultaneously. The host contacts the controlling enclosure monitor using the faster, more direct path, but also communicates with the controlling enclosure monitor by the more reliable but less expedient second port access path using the opposite enclosure monitor.

Dual SCSI enclosure 1000A differs from dual port enclosure 600 only in that the present dual port enclosures serviced by a single host device 1016 and that enclosure monitor 1014 communicates with enclosure monitor 1024 through interconnecting bus 1070, such as a I²C or RS-232 bus or the like. In this embodiment an enclosure monitor receives an isolation or connection request and then determines if it controls the target port. It the recipient enclosure monitor controls the target port, it merely issues an isolation control signal to the bus expander in a manner identical to that described above with respect to FIG. 6. If the recipient enclosure monitor does not control the target port, it passes the request to the controlling enclosure monitor via interconnecting bus 1070. From there the isolation request is handled identically to that described above with respect to FIG. 6. Alternatively, the enclosure monitors may communicate their respective isolation states to each other. Then, prior to passing an isolation request from one enclosure monitor to the other using the interconnecting bus, the recipient enclosure monitor checks the isolation state of the opposite port. If the controlling enclosure monitor had previously executed the isolation request, then the isolation request need not be passed.

Figure 10B:
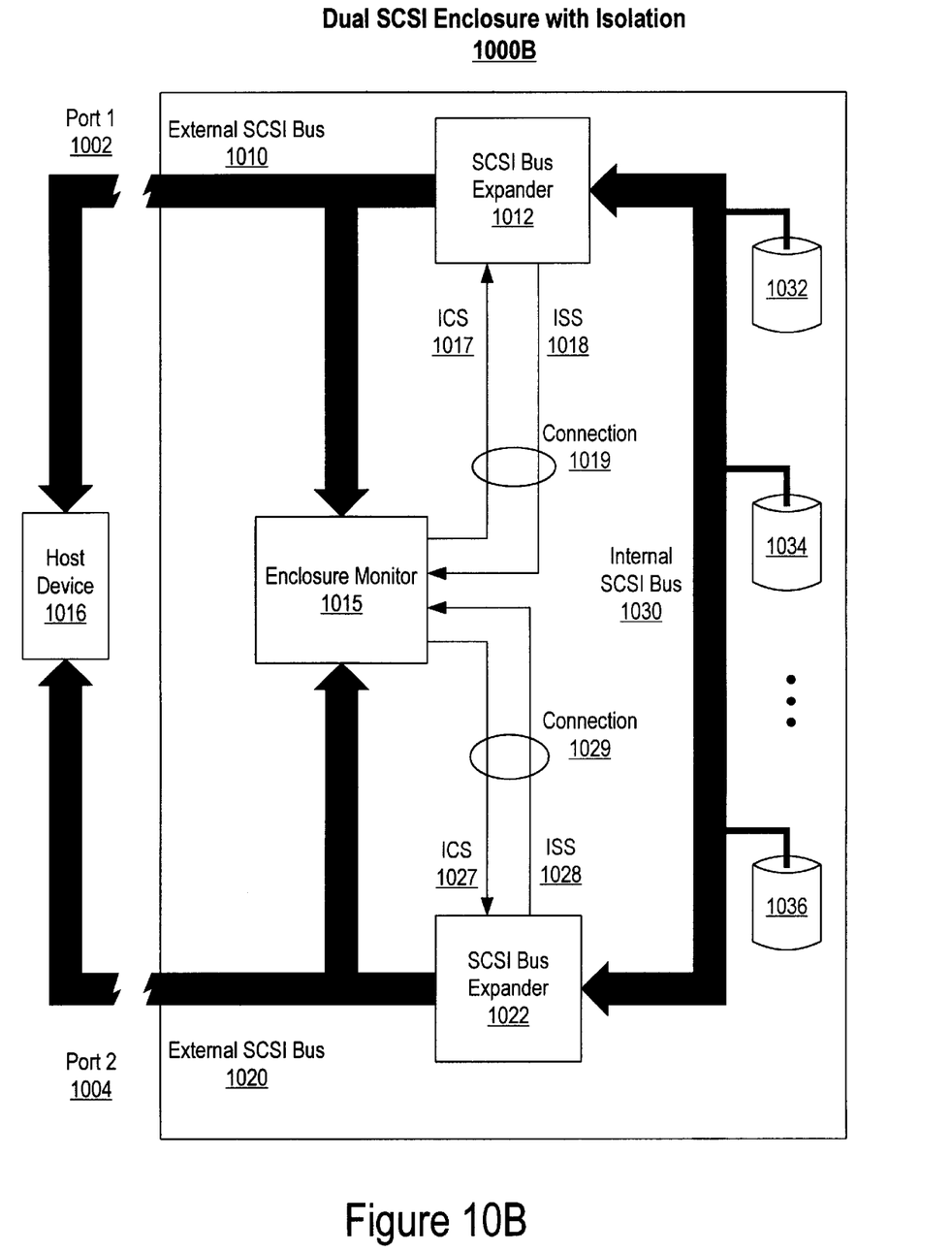
FIG. 10B is a block diagram depicting a dual SCSI enclosure with a single dual port enclosure monitor in accordance with a preferred embodiment of the present invention.

FIG. 10B is a block diagram depicting a dual SCSI enclosure with a single dual port enclosure monitor in accordance with a preferred embodiment of the present invention. Dual SCSI enclosure 1000B is similar to dual SCSI enclosure 1000A except that enclosure monitors 1014 and 1016, and interconnecting bus 1070, have been replaced by dual port enclosure monitor 1015. There, dual port enclosure monitor 1015 controls either of SCSI bus expanders 1012 and 1022 from isolation requests received on either of port 1 1002 or port 2 1004. The operation of dual SCSI enclosure 1000B is similar to that of dual SCSI enclosure 1000A, but rather than communicating to a second enclosure monitor, the recipient enclosure monitor merely responds to the request by sending an isolation control signal to the appropriate bus expander.

Clearly, the important aspects of the present invention may be practiced on a plurality of different bus protocols and connection configurations and is no way limited to a SCSI bus. It is important to note that while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media, such as floppy discs, hard disk drives, RAM, CD-ROMs, and transmission-type media, such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated. One of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. Therefore, it is the object of the appended claims to cover all such variations and modifications as come within the true spirit and scope of the invention.

What is claimed is:

1. Data processing implemented method for dynamically configuring a dual port enclosure comprising:

receiving an isolation request at a first port, over a first primary bus, wherein a host generates the isolation request in response a bus fault being detected on the first primary bus and wherein the isolation request is received by a first enclosure monitor; and in response to receiving the isolation request, transmitting an isolation control signal to a first bus expander on an off-bus connection, wherein the first bus expander acts on the isolation control signal to isolate an internal bus from a first external bus, wherein the internal bus remains connected to a second external bus through a second bus expander.

2. The method recited in claim 1, wherein the first bus expander is connected to a second port, serviced by a second primary bus.

3. The method recited in claim 2 further comprises:
receiving a second isolation request at the second port, over the second primary bus, wherein the second isolation request is received by a second enclosure monitor; and
in response to receiving the second isolation request, transmitting a second isolation control signal to a second bus expander.

4. The method of claim 2, wherein the first external bus is the second primary bus.

5. The method recited in claim 1, wherein the first bus expander is connected to the first port, serviced by a the first primary bus.

6. The method recited in claim 5, further comprises:
receiving a second isolation request at a second port, over a second primary bus, wherein the second isolation request is received by a second enclosure monitor; and
in response to receiving the second isolation request, transmitting a second isolation control signal to a second bus expander.

7. The method of claim 5, wherein the first external bus is the first primary bus.

8. The method recited in claim 1, wherein the first bus expander is logically isolated from the first primary bus.

9. The method recited in claim 1, wherein the first enclosure monitor remains connected to the first primary bus.

10. The method recited in claim 1, wherein the enclosure monitor remains connected to the bus expander through the off-bus connection.

11. The method recited in claim 1, wherein at least one peripheral device is attached to the secondary internal bus.

12. The method recited in claim 1, wherein one of the first and second enclosure monitors contain embedded intelligence for sensing the condition of one of the first and second primary buses.

13. Data processing implemented method for dynamically configuring a dual port enclosure comprising:
receiving an isolation request at a first port, over a first primary bus, wherein the isolation request is received by a first enclosure monitor;
in response to receiving the isolation request, passing the isolation request to a second enclosure monitor; and
transmitting an isolation control signal to a first bus expander on an off-bus connection, wherein the first bus expander acts on the isolation control signal.

14. The method recited in claim 13 further comprises:
receiving a second isolation request at a second port, over a second primary bus, wherein the second isolation request is received by the second enclosure monitor; and
in response to receiving the second isolation request, passing the second isolation request to the first enclosure monitor.

15. The method recited in claim 13 wherein the first bus expander is connected to a second port, serviced by a second primary bus.

16. Data processing implemented method for dynamically configuring a dual port enclosure comprising:
receiving an isolation request at a first port, over a first primary bus, wherein the isolation request is received by a first enclosure monitor; and
in response to receiving the isolation request, transmitting an isolation control signal to a first bus expander on an off-bus connection, wherein the first bus expander acts on the isolation control signal,
wherein the first enclosure monitor is dual ported and connected to the first primary bus through a first port and a second primary bus through a second port.

17. The method recited in claim 16 further comprises:
receiving a second isolation request at the second port, over the second primary bus, wherein the isolation request is received by a the first enclosure monitor; and
in response to receiving the second isolation request, transmitting a second isolation control signal to one of the first bus expander and a second bus expander.

18. A system for dynamically configuring a dual port enclosure comprising:
receiving means for receiving an isolation request at a first port, over a first primary bus, wherein a host generates the isolation request in response a bus fault being detected on the first primary bus and wherein the isolation request is received by a first enclosure monitor; and
transmitting means for transmitting an isolation control signal to a first bus expander on an off-bus connection in response to receiving the isolation request, wherein the first bus expander acts on the isolation control signal to isolate an internal bus from a first external bus,
wherein the internal bus remains connected to a second external bus through a second bus expander.

19. The system recited in claim 18, wherein the first bus expander is connected to a second port, serviced by a second primary bus.

20. The system recited in claim 19 further comprises:
receiving means for receiving a second isolation request at the second port, over the second primary bus, wherein the isolation request is received by a second enclosure monitor; and
transmitting means for transmitting a second isolation control signal to the second bus expander, in response to receiving the second isolation request.

21. The system recited in claim 18, wherein the first bus expander is connected to the first port, serviced by the first primary bus.

22. The system recited in claim 21 further comprises:
receiving means for receiving a second isolation request at a second port, over a second primary bus, wherein the isolation request is received by a second enclosure monitor; and
transmitting means for transmitting a second isolation control signal to the second bus expander in response to receiving the second isolation request.

23. A system for dynamically configuring a dual Port enclosure comprising:
receiving means for receiving an isolation request at a first port, over a first primary bus, wherein the isolation request is received by a first enclosure monitor;
passing means for passing the isolation request to a second enclosure monitor; and
transmitting means for transmitting an isolation control signal to a first bus expander on an off-bus connection in response to receiving the isolation request, wherein the first bus expander acts on the isolation control signal.

24. The system recited in claim 23 further comprises:
receiving means for receiving a second isolation request at a second port, over a second primary bus, wherein the isolation request is received by the second enclosure monitor; and passing means for passing the second isolation request to the first enclosure monitor in response to receiving the second isolation request.

25. The system recited in claim 23, wherein the first bus expander is connected to a second port, serviced by a second primary bus.

26. A system for dynamically configuring a dual port enclosure comprising:

receiving means for receiving an isolation request at a first port, over a first primary bus, wherein the isolation request is received by a first enclosure monitor; and transmitting means for transmitting an isolation control signal to a first bus expander on an off-bus connection in response to receiving the isolation request, wherein the first bus expander acts on the isolation control signal, wherein the first enclosure monitor is dual ported and connected to the first primary bus through the first port and a second primary bus through a second port.

27. The system recited in claim 26 further comprises:

receiving means for receiving a second isolation request at the second port, over the second primary bus, wherein the isolation request is received by a the first enclosure monitor; and transmitting means for transmitting a second isolation control signal to one of the first bus expander and a second bus expander in response to receiving the second isolation request.

28. A dynamically configurable dual port enclosure comprising:

a first port connected to a first primary bus;

a second port connected to a second primary bus;

a secondary bus;

a first bus expander connecting the first primary bus to a first end of the secondary bus;

a second bus expander connecting the second primary bus to a second end of the secondary bus; and a first bus monitor connected to the first primary bus through the first port, wherein the first bus monitor, responsive to receiving an isolation request at the first port, transmits an isolation control signal to the first bus expander, wherein a host generates the isolation request in response a bus fault being detected on the first primary bus, wherein the first bus expander acts on the isolation control signal to isolate the secondary bus from the first primary bus, and wherein the secondary bus remains connected to the second primary bus through the second bus expander.

29. The dynamically configurable dual port enclosure recited in claim 28, wherein the first enclosure monitor is connected to the first bus expander using a first off-bus connection.

30. The dynamically configurable dual port enclosure recited in claim 28, further comprises:

a second enclosure monitor, wherein the second enclosure monitor is connected to the second bus expander using a second off-bus connection.

31. The dynamically configurable dual port enclosure recited in claim 28, further comprises:

a second enclosure monitor, wherein the second enclosure monitor is connected to the first enclosure monitor.

32. The dynamically configurable dual port enclosure recited in claim 28, wherein the first enclosure monitor contains onboard intelligence of sensing to condition of one of the first primary bus and the second primary bus.

33. A dynamically configurable dual port enclosure comprising:

a first port connected to a first primary bus;

a second port connected to a second primary bus;

a secondary bus;

a first bus expander connecting the first primary bus to a first end of the secondary bus;

a second bus expander connecting the first primary bus to a second end of the secondary bus; and a first enclosure monitor connected to the first primary bus through the first port, wherein the first enclosure monitor is connected to the second bus expander using a first off-bus connection.

34. The dynamically configurable dual port enclosure recited in claim 31, further comprises:

a second enclosure monitor, wherein the second enclosure monitor is connected to the first bus expander using a second off-bus connection.

35. A dynamically configurable dual port enclosure comprising:

a first port connected to a first primary bus;

a second port connected to a second primary bus;

a secondary bus;

a first bus expander connecting the first primary bus to a first end of the secondary bus;

a second bus expander connecting the first primary bus to a second end of the secondary bus; and a first enclosure monitor connected to the first primary bus through the first port, wherein the first enclosure monitor is dual ported and connected to the first primary bus through the first port and the second primary bus through the second port.

36. A dynamically configurable dual port enclosure comprising:

a first port connected to a first primary bus;

a second port connected to a second primary bus;

a secondary bus;

a first bus expander connecting the first primary bus to a first end of the secondary bus;

a second expander connecting the first primary bus to a second end of the secondary bus; and a first enclosure monitor connected to the first primary bus through the first port, wherein the first enclosure monitor is dual ported having one port connected to the first primary bus through the first port and another port connected to the second primary bus through the second port and further connected to each of the first enclosure monitor and a second enclosure monitor through separate off-board connections.

* * * * *